United States Patent Office 2,841,862
Patented July 8, 1958

2,841,862

CHROMIUM AND TITANIUM OXIDE REFRACTORY COMPOSITIONS

Edward W. Goliber, Oakland, Mich., assignor to General Electric Company, a corporation of New York No Drawing. Application May 27, 1954
Serial No. 432,934

5 Claims. (Cl. 29—182.5)

This invention relates to hard refractory compositions produced by powder metallurgy from pulverulent metallic chromium and lower oxides or suboxides of titanium, the latter by definition referring to oxides of titanium containing less oxygen than is present in the normal titanium dioxide.

The need for materials having high strength and high hardness is ever increasing and of major importance in present industrial applications. There is also need for materials having resistance to oxidation at elevated temperatures as well as resistance to abrasion. Such materials are extremely useful in manufacturing cutting tools, extrusion and drawing dies, aircraft component parts, critical furnace parts, etc.

It is known that the lower oxides or suboxides of titanium, for example, those approximating titanium monoxide in composition, are very hard substances. However, these materials lack strength and are much too brittle for practical use.

It now has been found that the extreme brittleness and fragility of titanium suboxides alone and of products containing large percentages of titanium suboxides made by melting and casting techniques, can be overcome and useful compositions obtained by pressing and sintering pulverulent mixtures of titanium suboxides and chromium. The resulting products are strong, hard and chemically inert.

The percentages of chromium and titanium suboxides comprising the compositions of the invention may vary within certain limits. For example, strong hard substances may be obtained by utilizing an amount of chromium lying in the range of between about 15 and about 50 percent, by weight of the composition, the remainder being titanium and oxygen in a Ti/O atomic ratio varying from about 0.68 to about 1.35. Within these broad ranges, preferred compositions contain between 30 and 45 weight percent chromium, the remainder titanium and oxygen in a Ti/O atomic ratio between 0.85 and 1.15. These compositions contain only about 22 to about 36 volume percent chromium due to the higher density of chromium. It is to be understood that minor amounts of impurities may be introduced in the starting materials and during processing. Iron, for example, may be present as an impurity in amounts up to about 1 percent, by weight.

By using the specified compositional range of the invention, both strength and hardness can be combined in a single material. These limits are critical since compositions above the specified chromium or oxygen contents lack high hardness while compositions below the specified chromium content lack strength. Similarly, compositions below the specified oxygen content are difficult to prepare and tend to be brittle. The criticality of these limits is best illustrated hereinafter by Examples 2, 4 and 7 in which the compositions are outside the specified ranges.

The titanium suboxides employed in the compositions of the present invention are prepared from an intimate mixture of titanium metal powder and titanium dioxide mixed in predetermined proportions. The resulting powder is first compacted into briquettes and then caused to react by heating from about 1100° to about 1400° C. in a hydrogen atmosphere. The reacted briquettes, being very friable, are thereafter readily crushed and milled to a fine powder. Because the initial titanium powder is somewhat oxidized and because of some oxidation of the mixed powders during processing, a lesser amount of oxygen is added in the form of titanium dioxide than ordinarily would correspond to the final oxygen content desired.

Chromium suitable for preparing the present composition may be commercially available chromium powder containing small amounts of carbon, iron, oxygen, etc.

In practice, the titanium suboxides and chromium powder are mixed in desired proportions and thoroughly milled for periods ranging up to several days and sintered in a hydrogen atmosphere under controlled conditions. The milling period is dependent in part upon the mill load and the particle size of the initial powders.

In order that those skilled in the art may better understand how the present invention may be practiced, the following examples are given by way of illustration and not by way of limitation. All parts and percentages are by weight.

EXAMPLE 1

A titanium oxide containing approximately 80 percent titanium was prepared by intimately mixing 100 parts of titanium metal powder and 56 parts of titanium dioxide. The mixed powders were pressed into briquettes which were reacted in a hydrogen atmosphere at about 1400° C. Thereafter, the briquettes were crushed and milled to a fine powder which by analysis showed 79.2 percent titanium and less than 0.5 percent iron. The formation of a titanium suboxide having a Ti/O atomic ratio as indicated by the foregoing analysis (oxygen by difference) was in agreement with an examination of the powders by X-ray powder diffraction methods using information and techniques well known to the art.

A commercially available grade of carbon reduced chromium powder, minus 270 mesh, was milled with acetone for a period of 72 hours, dried and analyzed. The analysis of the milled powder was as follows:

Chromium _____ 91 percent.
Iron _____ 1.5 percent.
Carbon _____ Less than 1.0 percent.
Oxygen _____ Approximately 7.0 percent (by difference).

51.0 parts of the titanium suboxide and 40.0 parts of the milled chromium powder were intimately mixed by milling with acetone for an additional period of 48 hours. The powder was dried, cold pressed at about 20,0000 p. s. i. and the compact thereafter sintered in a hydrogen atmosphere at about 1475° C. for approximately 30 minutes.

The resulting sintered product was strong and very hard. It was generally resistant to chemical action. Resistance to oxidation at elevated temperatures was indicated by the formation of only a very thin oxide film on the surface of the bar after prolonged exposure in an air atmosphere at 1000° C. Properties and a chemical analysis of a typical sample bar of the composition are as follows:

Hardness (Rockwell A) ___ 86.
Modulus of rupture _____ 80,000 p. s. i.
Titanium _____ 44.6 percent.
Chromium _____ 39.8 percent.
Carbon _____ 0.5 percent.
Iron _____ 1.1 percent.
Oxygen _____ 14.0 percent (by difference).

The Ti/O atomic ratio calculated from the above analysis (oxygen obtained by difference) was found to be 1.06. Examination of the sintered composition by means of X-ray diffraction indicated that it contained metallic chromium and a suboxide of titanium approximating titanium monoxide in composition. Metallographic examination of a polished sample indicated a structure consisting of particles approximately 3 microns in diameter intimately dispersed in a continuous phase.

The effect of oxygen content on strength and hardness is illustrated by the examples shown in Table I. In these examples the compositions contained approximately 38 weight percent chromium and the Ti/O atomic ratio was varied. The procedure employed in preparing these compositions was similar to that of Example 1.

Table I

|  | Ti/O Ratio | Hardness Rockwell A Scale | Modulus of Rupture, p. s. i. |
|---|---|---|---|
| Example 2 | 1.57 | 86.0 | [1] 35,000–70,000 |
| Example 3 | 0.98 | 86.9 | 70,000–85,000 |
| Example 4 | 0.65 | 82.0 | 30,000–40,000 |

[1] (Tended to be very brittle.)

The results of these tests illustrate that the composition of Example 3 with a Ti/O atomic ratio of 0.98, within the range specified, was superior to the compositions of Examples 2 and 4, both of which had Ti/O atomic ratios outside the specified range.

Additional examples are given in Table II to illustrate the effect of chromium content on hardness. In these compositions the Ti/O atomic ratio is approximately unity. The procedure employed in preparing these compositions was similar to that of Example 1.

Table II

|  | Percent Chromium | Hardness Rockwell A Scale |
|---|---|---|
| Example 5 | 24.2 | 89 |
| Example 6 | 40.4 | 86 |
| Example 7 | 52.5 | 75 |

The hardness data for these compositions demonstrate that as the percent chromium increases, the hardness decreases. The low hardness of compositions having more than 50 percent chromium, as in Example 7, is particularly significant.

While Example 1 illustrates a general procedure which may be employed in preparing the compositions of the present invention, it is to be understood that variations in processing are within the scope of the invention. For example, sintering temperatures may be varied from about 1350° C. to about 1550° C. and inert atmospheres other than hydrogen may be employed. Additionally, the usual procedures and techniques employed in powder metallurgy for the molding or pressing of powders generally are applicable and, within the limits defined, the compositions may be varied percentagewise to obtain variations in properties as desired.

The compositions of the present invention have a wide range of utility. Due to their unique properties, they are very useful in the fabrication of cutting tools, extrusion and drawing dies, aircraft component parts, critical furnace parts, etc.

Chromium base refractory compositions consisting essentially of from about 55 to about 85 percent, by weight of the composition, of chromium, and from about 33 to about 4.2 percent, by weight of the composition, of titanium, the remainder being oxygen, which compositions exhibit superior strength at normal temperatures, are generally chemically inert, strong, and have good resistance to oxidation at high temperatures, are the subject matter of, and are claimed in, my copending application Serial No. 432,933 filed concurrently herewith, and assigned to the assignee of the present invention.

What I claim as new and desire to secure by Letters Patent of the United States is:

1. A sintered refractory composition consisting essentially of from about 15 to about 50 percent, by weight of the composition, of chromium, and a suboxide of titanium having a Ti/O atomic ratio of from about 0.68 to about 1.35.

2. A sintered product consisting essentially of a titanium oxide approximating titanium monoxide in composition, and chromium, the chromium content corresponding to from about 15 to about 50 percent, by weight of the product.

3. A sintered composition consisting essentially of from about 30 to about 45 percent, by weight of the composition, of chromium, the remainder being a suboxide of titanium having a Ti/O atomic ratio of from about 0.68 to about 1.35.

4. A sintered composition consisting essentially of from about 30 to about 45 percent, by weight of the composition, of chromium, the remainder being a suboxide of titanium having a Ti/O atomic ratio of from about 0.85 to about 1.15.

5. A sintered composition consisting essentially of from about 15 to about 50 percent, by weight of the composition, of chromium, the remainder being a suboxide of titanium having a Ti/O atomic ratio of from about 0.85 to about 1.15.

References Cited in the file of this patent

UNITED STATES PATENTS

| 2,656,596 | Conant et al. | Oct. 27, 1953 |
| 2,698,990 | Conant et al. | Jan. 11, 1955 |
| 2,783,530 | Conant | Mar. 5, 1957 |

FOREIGN PATENTS

| 645,681 | Great Britain | Nov. 8, 1950 |
| 676,441 | Great Britain | July 30, 1952 |